United States Patent
Hu et al.

(10) Patent No.: US 12,008,210 B2
(45) Date of Patent: Jun. 11, 2024

(54) SYSTEMS AND METHODS FOR CHANGING REPRESENTATIONS OF APPLICATIONS BASED ON APPLICATION STATUS

(71) Applicant: Apple Inc., Cupertino, CA (US)

(72) Inventors: Peter B. Hu, Foster City, CA (US); Manikandan Selvaraju, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/790,174

(22) PCT Filed: Jan. 15, 2021

(86) PCT No.: PCT/US2021/013690
§ 371 (c)(1),
(2) Date: Jun. 30, 2022

(87) PCT Pub. No.: WO2021/146592
PCT Pub. Date: Jul. 22, 2021

(65) Prior Publication Data
US 2023/0040173 A1    Feb. 9, 2023

(51) Int. Cl.
*G06F 3/04817*    (2022.01)
*G06F 3/0482*    (2013.01)
(Continued)

(52) U.S. Cl.
CPC ........ *G06F 3/04817* (2013.01); *G06F 3/0482* (2013.01); *G06F 3/0484* (2013.01);
(Continued)

(58) Field of Classification Search
CPC .. G06F 3/04817; G06F 3/0482; G06F 3/0484; G06F 9/451; G06F 9/542; G06F 3/04812; G06F 9/453; G06Q 20/3267
See application file for complete search history.

(56) References Cited

U.S. PATENT DOCUMENTS 8,136,100 B1 *    3/2012   Goldman ............ G06F 9/45558
                                                                717/136
9,594,884 B2 *    3/2017   Li .......................... G06F 21/121
(Continued)

FOREIGN PATENT DOCUMENTS

IN       201841025727 A  *  1/2020

OTHER PUBLICATIONS

How to create in-app purchase to upgrade from free version to paid version android, retrieved from—https://stackoverflow.com/questions/19509607/how-to-create-in-app-purchase-to-upgrade-from-free-version-to-paid-version-andro, Oct. 22, 2013, 2 pages (Year: 2013).*

(Continued)

*Primary Examiner* — Yongjia Pan
(74) *Attorney, Agent, or Firm* — Polsinelli PC

(57) ABSTRACT

The present technology includes systems and methods for indicating a status of an application on a graphical user interface. The systems and methods include displaying, on a graphical user interface a plurality of application icons associated with a plurality of applications. A first application of the plurality of applications has a first application status represented by a first application icon. The first application can change from the first application status to a second application status. The second application status is different from the first application status. The second application status having a second application icon reflecting the second application status, wherein the second application icon is different from the first application icon.

18 Claims, 8 Drawing Sheets

(51) Int. Cl.
*G06F 3/0484* (2022.01)
*G06F 9/451* (2018.01)
*G06F 9/54* (2006.01)
*G06Q 20/32* (2012.01)

(52) U.S. Cl.
CPC .............. *G06F 9/451* (2018.02); *G06F 9/542* (2013.01); *G06Q 20/3267* (2020.05)

(56) References Cited

U.S. PATENT DOCUMENTS

| | | | | |
|---|---|---|---|---|
| 10,048,828 | B2* | 8/2018 | Hyun | G06F 3/0488 |
| 10,152,197 | B1* | 12/2018 | Xue | G06F 9/453 |
| 10,324,583 | B2* | 6/2019 | Jiang | G06F 3/0482 |
| 10,452,818 | B2* | 10/2019 | Minagawa | G06F 21/105 |
| 10,558,546 | B2* | 2/2020 | Cranfill | G06F 11/3438 |
| 11,003,312 | B2* | 5/2021 | Sakaino | G06F 3/0482 |
| 11,016,637 | B2* | 5/2021 | Ryu | G06F 3/0482 |
| 11,137,876 | B2* | 10/2021 | Gao | G06F 3/04817 |
| 11,204,979 | B2* | 12/2021 | Yamazaki | G06F 21/105 |
| 2001/0011253 | A1* | 8/2001 | Coley | H04L 9/3297 705/59 |
| 2006/0106725 | A1* | 5/2006 | Finley, Jr. | G06F 3/04817 705/59 |
| 2009/0150820 | A1* | 6/2009 | Hayman | G06F 3/0482 715/772 |
| 2013/0132906 | A1* | 5/2013 | Siurumaa | G06F 3/04817 715/835 |
| 2015/0186625 | A1* | 7/2015 | Li | G06F 21/10 726/27 |
| 2017/0068421 | A1* | 3/2017 | Carlson | G06F 3/04817 |
| 2018/0192117 | A1* | 7/2018 | Liston | G06F 9/451 |
| 2021/0223942 | A1* | 7/2021 | Hu | G06F 3/04817 |

OTHER PUBLICATIONS

Google Play Subscription Upgrade / Downgrade, retrieved from—https://forum.unity.com/threads/google-play-subscription-upgrade-downgrade.528434/, Jun. 7, 2018, 18 pages (Year: 2018).*

Dynamically Change the App Icon, retrieved from—https://medium.com/ios-os-x-development/dynamically-change-the-app-icon-7d4bece820d2, Jan. 25, 2018, 5 pages (Year: 2018).*

Matthew Greenbaum, Dynamic Subscription Icons in StoreFront, retrieved from—https://www.citrix.com/blogs/2017/12/14/dynamic-subscription-icons-in-storefront/, Jan. 3, 2018, 7 pages (Year: 2018).*

Google Play subscriptions UX journeys, retrieved from—https://www.youtube.com/playlist?list=PLWz5rJ2EKKc9J8ylTbNo1mnwciEyMbxZG, Feb. 5, 2019, 27 pages (Year: 2019).*

Best way to have paid and free version of an Android app [closed], retrieved from—https://stackoverflow.com/questions/3711967/best-way-to-have-paid-and-free-version-of-an-android-app, Apr. 12, 2015, 12 pages (Year: 2015).*

Maintaining both free and pro versions of an application, retrieved from—https://stackoverflow.com/questions/2529062/maintaining-both-free-and-pro-versions-of-an-application, Mar. 27, 2010, 5 pages (Year: 2010).*

Is this possible to apply the alternative icon to the iOS application?, retrieved from—https://stackoverflow.com/questions/41950994/is-this-possible-to-apply-the-alternative-icon-to-the-ios-application, Jan. 31, 2017, 4 pages (Year: 2017).*

How to test Google Play Real Time Notifications for Subscriptions?, retrieved from—https://stackoverflow.com/questions/59716601/how-to-test-google-play-real-time-notifications-for-subscriptions, Jan. 13, 2020, 2 pages (Year: 2020).*

Per Device subscriptions for purchases through Google Play, retrieved from—https://stackoverflow.com/questions/15888270/per-device-subscriptions-for-purchases-through-google-play, Apr. 8, 2013, 3 pages (Year: 2013).*

Am I getting the steps right for verifying a user's Android in-app subscription?, retrieved from—https://stackoverflow.com/questions/12427479/am-i-getting-the-steps-right-for-verifying-a-users-android-in-app-subscription, Sep. 14, 2012, 10 pages (Year: 2012).*

Check the status of In-App Subscription in Android, retrieved from—https://stackoverflow.com/questions/31957406/check-the-status-of-in-app-subscription-in-android, Aug. 12, 2015, 3 pages (Year: 2015).*

Android: How to check if user have active subscription or not, retrieved from—https://stackoverflow.com/questions/57081146/android-how-to-check-if-user-have-active-subscription-or-not, Jul. 17, 2019, 3 pages (Year: 2019).*

* cited by examiner

SYSTEMS AND METHODS FOR CHANGING REPRESENTATIONS OF APPLICATIONS BASED ON APPLICATION STATUS

TECHNICAL FIELD

This application is a 35 U.S.C. § 371 national phase application that claims priority to application number PCT/US21/13690, filed on Jan. 15, 2021, which is a Patent Cooperation Treaty filing under 35 U.S.C. § 363 that claims priority to U.S. application Ser. No. 16/746,551, filed on Jan. 17, 2020. All of which are expressly incorporated by reference herein in their entireties.

TECHNICAL FIELD

The present technology pertains to presenting a representation of an application by a graphical user interface of a computing system, and more specifically pertains to presenting alternative representations of the application based on a status of the application and associated features.

BACKGROUND

User interaction with electronic devices has increased significantly in recent years. The electronic devices can include devices such as computers, tablet computers, televisions, multimedia devices, mobile devices, etc. These devices can support applications or "apps". Some apps can be downloaded through user interaction. In some examples, an app downloaded on a device may be displayed on a graphical user interface of the device using a representation such as an icon. The icon can be used to launch or access the app. Some apps may have a variety of features which may be associated with in-app purchases, tier levels, subscriptions, etc. It is possible for different versions of the app to have different feature sets. However, current implementations use the same icon on the graphical user interface for representing the various versions of the app.

BRIEF SUMMARY

Systems and methods for are disclosed for indicating a status of an application on a graphical user interface. The systems and methods include displaying, on a graphical user interface a plurality of application icons associated with a plurality of applications. A first application of the plurality of applications has a first application status represented by a first application icon. The first application can change from the first application status to a second application status. The second application status is different from the first application status. The second application status having a second application icon reflecting the second application status, wherein the second application icon is different from the first application icon.

According to at least one example, a method of indicating a status of an application on a graphical user interface is provided. The method includes displaying, on a graphical user interface of a computing device, a plurality of application icons associated with a plurality of applications installed on the computing device, wherein a first application of the plurality of applications has a first application status represented by a first application icon, and wherein the first application status corresponds to a first set of features available using the first application. The method further includes receiving an input associated with changing the first application from the first application status to a second application status, wherein the second application status is different from the first application status, the second application status corresponds to a second set of features available using the first application, and the second set of features is different from the first set of features. The method further includes, in response to the input, replacing the first application icon with a second application icon reflecting the second application status, wherein the second application icon is different from the first application icon.

In another example, computing device is provided. The computing device comprises at least one processor; and at least one memory storing instructions, which when executed by the at least one processor causes the at least one processor to display, on a graphical user interface, a plurality of application icons associated with a plurality of applications, wherein a first application of the plurality of applications has a first application status represented by a first application icon, and wherein the first application status corresponds to a first set of features available using the first application; receive an input associated with changing the first application from the first application status to a second application status, wherein: the second application status is different from the first application status, the second application status corresponds to a second set of features available using the first application, and the second set of features is different from the first set of features; and in response to the input, replace the first application icon with a second application icon reflecting the second application status, wherein the second application icon is different from the first application icon.

In another example, at least one non-transitory computer readable medium storing instructions is provided, which when executed by at least one processor causes the at least one processor to: display, on a graphical user interface, a plurality of application icons associated with a plurality of applications installed on a computing device, wherein a first application of the plurality of applications has a first application status represented by a first application icon, and wherein the first application status corresponds to a first set of features available using the first application; receive an input associated with changing the first application from the first application status to a second application status, wherein: the second application status is different from the first application status, the second application status corresponds to a second set of features available using the first application, and the second set of features is different from the first set of features; and in response to the input, replace the first application icon with a second application icon reflecting the second application status, wherein the second application icon is different from the first application icon.

In some aspects of the method, computing device, and computer-readable medium described above, the input is an in-app purchase.

In some aspects of the method, computing device, and computer-readable medium described above, the input is a cold launch of the first application.

In some aspects of the method, computing device, and computer-readable medium described above, the input is a transition of the first application into the foreground of the graphical user interface.

In some aspects of the method, computing device, and computer-readable medium described above, the second application status is a downgrade from the first application status.

In some aspects of the method, computing device, and computer-readable medium described above, the second application status is an upgrade from the first application status.

In some aspects of the method, computing device, and computer-readable medium described above, the first application status is a first tier level of a plurality of tier levels and the second application status is a second tier level of the plurality of tier levels.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to provide a better user experience to users of apps which may have different versions or associated feature sets. Specifically, the present technology can automatically update a representation of an app on a graphical user interface of a device to reflect a status of the app. For example, an icon on the graphical user interface can provide a representation of the app, where the icon can be changed to reflect a change in the status of the app. In various examples, the status of the app can vary based on features associated with the app, a version of the app, or other characteristics of the app. Changing the icon based on changes in the status of the app provides an elegant solution for representing the changes in the status of the app.

Figure 1C:
FIGS. 1A-C illustrate an electronic device with a graphical user interface, in accordance with some examples.
Figure 1B:
Figure 1A:
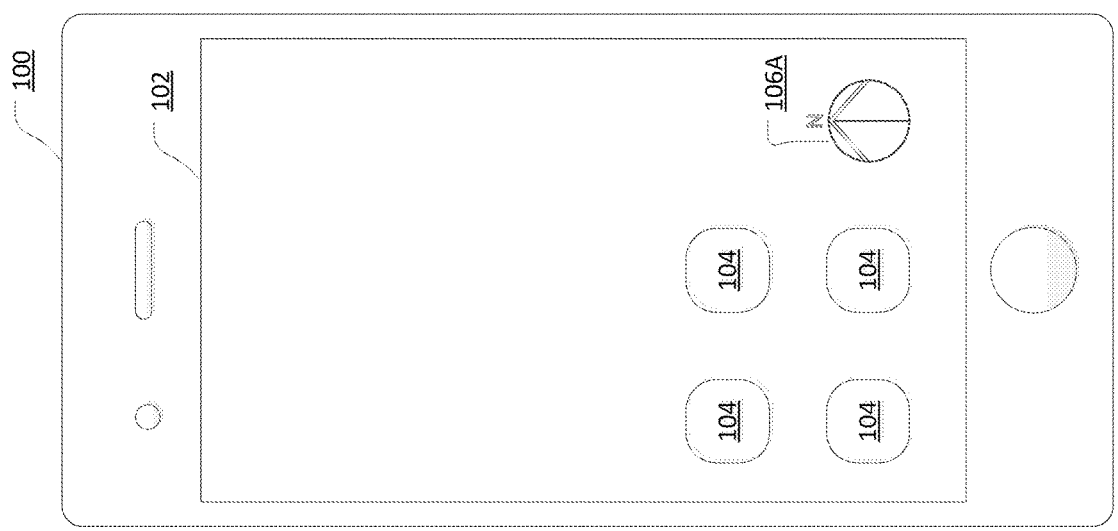

FIGS. 1A-C are schematic diagrams of a user device 100 configured according to example aspects of this disclosure. The user device 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, a smart watch, an Internet Protocol (IP) camera, or any other suitable electronic device.

The user device 100 can include a display 102, where the display 102 may be capable of providing a graphical user interface for user interaction with one or more applications. For example, the graphical user interface can include one or more icons such as icons 104, 106, etc. (e.g., where the icon 106 can have different versions identified as 106A, 106B, and 106C in FIGS. 1A, 1B, and 1C, respectively). The display 102 can include any of a variety of display devices such as a cathode ray tube (CRT), a liquid crystal display (LCD), a plasma display, an organic light emitting diode (OLED) display, or another type of display device. In some examples, the display 102 can support a touch screen functionality for interacting with a plurality of apps which may be associated with respective icons 104, 106, etc.

Considering the various versions of the icon 106 in more detail, the first version 106A of FIG. 1A, the second version 106B of FIG. 1B, and the third version 106C of FIG. 1C are each depicted with different symbols or logos according to an illustrative example. In the illustrative example, the different versions 106A, 106B, and 106C of the icon 106 are associated with respective versions of an app, for example a "News app" (with a corresponding symbol "N"). The different versions of the News app may be differentiated in various ways. For example, the different versions of the News app may be associated with different tiers, different subscription levels, different statuses, different feature sets, in-app purchases, or other differentiating characteristics. Each tier, level, status, etc. can have a unique identifier.

For example, the first version 106A of the icon 106 shown in FIG. 1A may be associated with a first application status, a first tier level, a first set of features, no in-app purchases, or other characteristics of the News app. The first version 106A may have a logo, visual appearance, or other representation which can be distinguishable from the second and third versions 106B and 106C, respectively. In an illustrative example, the first version 106A may correspond to a free version of the News app which is made available to users free of cost. Correspondingly, the first set of features may include a limited feature set. For example, the first set of features may have a high volume of advertisements, limited or partially available content, restricted speed or resolution of multimedia content, fewer options for personalization, or any other constraints which may be placed on the free version to differentiate the free version from one or more types of paid versions which may be made available to users for charge.

For example, different tiers of the News app may be available for different purchase or paid upgrade options. In an illustrative example, if a user of the free version of the News app makes an in-app purchase based on interacting with the News app, then user may be deemed to qualify for a higher tier (a second tier) of the News app. For example, an in-app purchase may include a purchase of a product or service advertised on the News app and purchased by clicking on a link made available on the News app. The purchase may be for a product or service pertaining to the News app (e.g., for paid content of the News app) or for a third party product or service. Different price thresholds or other criteria (e.g., whether the purchase is for a News app product/service or a third party product/service) may be used to determine whether an in-app purchase may qualify for the second tier. For example, a qualifying purchase may unlock additional features of the News app which may be unavailable in the free version. A second set of features which includes the additional features may involve different or additional content, less advertisements than the free version, higher quality or resolution of media content, or other features which distinguish over the first set of features available in the free version of the News app. According to the illustrative example, a qualifying in-app purchase can lead to an upgrade to the second tier of the News app which provides the second set of features, where the second version 106B of the icon 106 can be associated with the second tier of the News app.

Proceeding further with the illustrative example, a different higher tier (a third tier) of the News app may be available for paid subscribers of the News app. For example, one or more types of periodic subscription options (e.g., monthly subscription) may be available for the News app. The third tier of the News app can provide a third set of features which may be different from the first and second sets of features. In some examples, the third set of features can include additions to the first set of features, the second set of features, or both. For example, the third set of features may involve different content, different level of advertisements, different quality or resolution of media content, or other features which distinguish over the first and second sets of features of the News app discussed above. While in the illustrative example, the second and third tiers are considered as upgrades from the free version, the third tier can be an even higher tier than the second tier, where the third tier can also be reached by upgrading from the second tier. In some example, the second tier can be a first subscription option and the third tier and can be a second subscription option, the first and second subscription options having different availability of features, as explained above. In such examples, the third version 106C of the icon 106 can be associated with the third tier of the News app.

In various examples, there may be more or less number of tiers/statuses or versions associated with an app, such as the News app discussed above, where each tier/status or version may have a corresponding set of features available. The set of features made available for an app can be based on entitlements corresponding to the app, and more specifically, the tier/status or version of the app. The entitlements can include the rights granted to an app, tool, or other executable program based on the respective tier/status or version.

Figure 2:
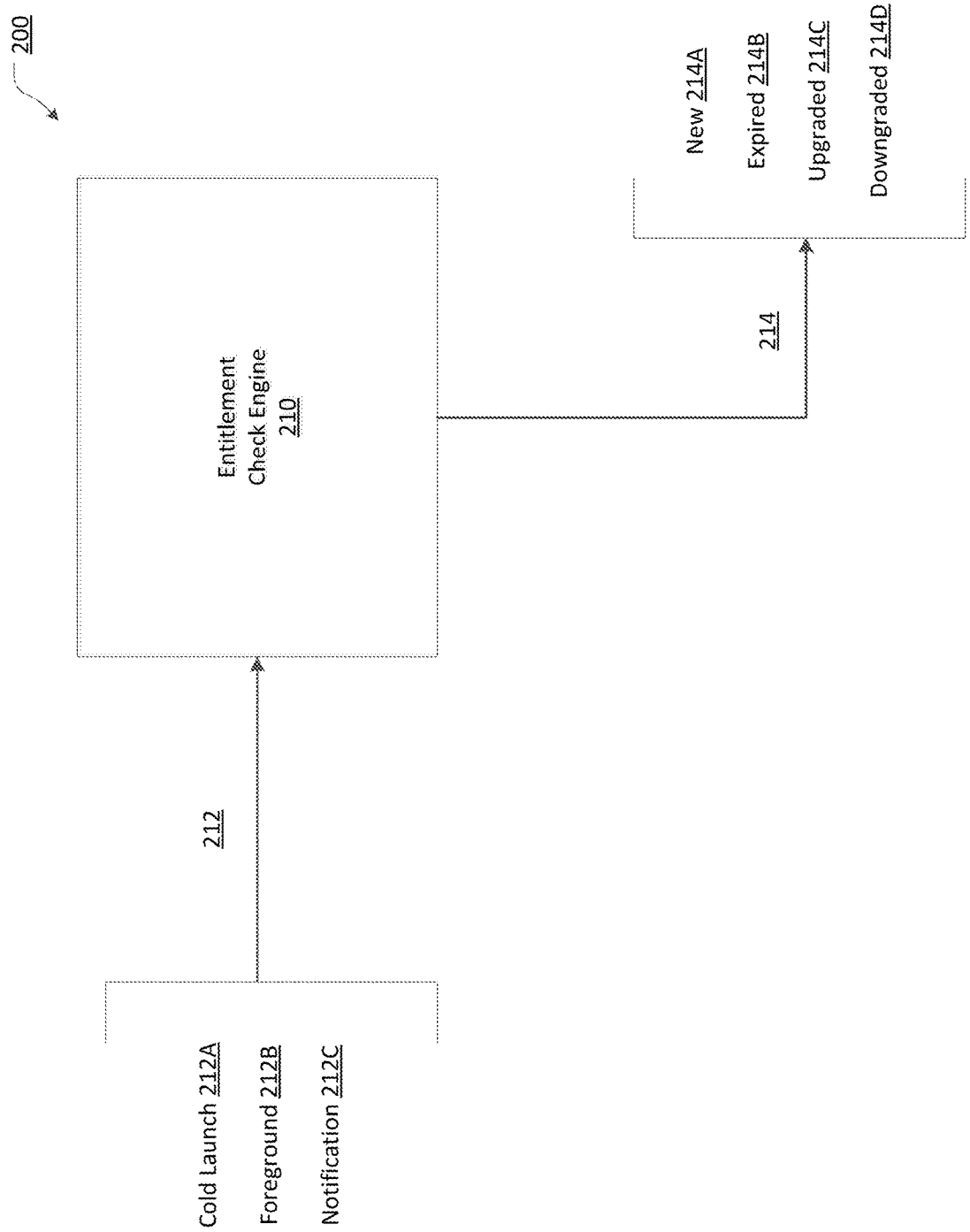
FIG. 2 illustrates an entitlement check engine configured in accordance with some examples.

FIG. 2 is a block diagram illustrating a system 200 for managing entitlements associated with apps on an electronic device. For example, the system 200 can be configured to manage entitlements for apps available on the device 100 of FIG. 1. System 200 can include entitlement check engine 210 which can determine a status or tier level of one or more applications of a device. In some examples, entitlement check engine 210 can be linked with a user account of an app store. In some examples, entitlement check engine 210 can be integrated with the app store.

An entitlement check engine 210 can receive an input 212 associated with one or more apps. An entitlement check can be performed based at least on the input 212 and one or more rules. For example, the entitlement check engine 210 can be configured with one or more rules for an app, where the one or more rules can be used to determine the entitlements for the app, whether there are any status updates for the app, or other actions pertaining to the app. In some examples, the entitlement check engine 210 can apply the one or more rules based on receiving the input 212 to generate an output 214, where the output 214 can include an action or a status message.

In the illustrative example shown in FIG. 2, the input 212 can include different types of events, notifications, states, etc., for an app such as the News app discussed above. For example, cold launch 212A, foreground 212B, and notification 212C are shown as example options for input 212 among other options which may be available. In some examples, the input 212 can provide a trigger for the entitlement check engine 210 to perform an entitlement check for the app.

Considering the options for the input 212 in more detail, the cold launch 212A can correspond to an event when the app is initiated, where prior to the cold launch 212A the app may have been in an inactive or dormant state. In some examples, the cold launch 212A can correspond to the first time the app is launched or executed after the app has been downloaded to the device 100. In some examples, the cold launch 212A can correspond to a subsequent launch of the app after a prior use of the app was terminated and the app was placed in an inactive state.

The foreground 212B option for the input 212 can include a status/tier of the app when the app is in active use or in the foreground of the display 102 or the graphical user interface of the device 100. For example, subsequent to a cold launch, the app can be brought into the foreground (e.g., from the background) where the app can remain until the app is terminated (e.g., interaction with the app is closed or the app is moved to the background). In some examples where the device 100 can support multitasking functionality, it is possible for multiple apps to be on the foreground simultaneously. In some examples, the input 212 corresponding to the foreground 212B can indicate a transition of an app into the foreground of the graphical user interface. In some instances, while in the foreground, an app (installed on device 100) can poll (entitlement check engine 210) for an update on the apps currently installed.

The notification 212C can include any notification or trigger which may be received from the app or from a source external to the app such as an app manager. For example, a common manager (e.g., iTunes store, iTunes, app store, etc.) for a plurality of apps on the device 100 can generate the notification 212C pertaining to the app. In some cases, the notification 212C can be generated while the app is in the foreground or in active use, while it is possible for the notification 212C to be generated while the app is not active.

In some examples, an app available for interaction through the graphical user interface of the device 100 can also be available on one more other devices. For example, a user may have access to several electronic devices such as a mobile phone, a laptop, and a tablet, with a respective version of the News app being available on all of these electronic devices (e.g., connected by a common user account). The common manager for the plurality of apps can include a central platform such as a cloud infrastructure (e.g., iTunes store, iTunes, app store, etc.). The common manager can synchronize operations and data pertaining to the News app on the electronic devices associated with the user account. Thus, for example, if an in-app purchase is made while interacting with the News app on the mobile phone, then a notification responsive to the in-app purchase can be generated by the common manager. Such a notification for the News app can be provided to other electronic devices such as the laptop and the tablet on the user account by the common manager, even if the News app is not in the foreground of the laptop or the tablet. Thus, in various examples, the notification 212C for an app can be external to or independent of the use of the app on a device. In other examples, the notification can come from an app store or a third party app connected to a user account of device 102 (e.g., iTunes store, iTunes, etc.). For example, a user can purchase, from a second device at an app store, a subscription to an app running on device 100. Notification 212C can be sent from the common manager, app store, third party app or the second user device.

As previously mentioned, the entitlement check engine 210 can receive the input 212 and determine the status/tier of the app. The output 214 of this determination can include one or more status messages. For example, the output 214 can include status messages such as new 214A, expired 214B, upgraded 214C, downgraded 214D, among other possible messages. The status message can also include a specific tier or status level and an app identity.

Thus in an illustrative example, when the input 212 indicates the cold launch 212A for the News app, then the entitlement check engine 210 can apply one or more rules for determining the status/tier to be assigned to the News app. For instance, the one or more rules can include determining whether there have been any notifications 212C received prior to the cold launch 212A indicating a qualifying purchase. In some examples, the qualifying purchase can include an in-app purchase (e.g., of a value greater than a predetermined threshold), a subscription (e.g., for a predetermined minimum term), or other payment pertaining to the News app. Upon the cold launch 212A, the entitlement check engine 210 can determine whether the News app is to retain its status/tier prior to the cold launch 212A or whether a change in the status/tier of the News app may be in order.

In an example of the output 214 including the status message new 214A, the free version of the News app may have been launched for the first time, and the new 214A message can correspond to the free version of the News app. For example, referring back to FIG. 1A, the first launch of the News app can pertain to the first time the icon 106 is added to the graphical user interface of the device 100, for which the version 106A may be the appropriate version.

In another illustrative example of the cold launch 212A, the entitlement check engine 210 can determine that a qualifying payment had been made (e.g., an in-app purchase or a subscription) which can lead to an upgrade of the News app to a higher tier/status such as the second tier or the third tier as previously mentioned. In such an example, the output 214 can indicate an upgraded 214C status, which can pertain to the version 106B or the version 106C of the icon 106 as shown in FIG. 1B or FIG. 1C, respectively.

In yet another illustrative example of the cold launch 212A, the entitlement check engine 210 can determine that the News app may have lost its higher tier/status (e.g., second tier, third tier, etc.) for any reason such as a time period for a subscription having ended, the time duration for which an in-app purchase qualifies for a higher tier may have lapsed, or any other rules which may dictate the loss of status for the News app. In an example where a subscription may have expired, an expired 214B status may be generated. In another example where a higher tier/status may be deemed to have been lost, the downgraded 214D status may be generated. In some examples, the expired 214B and the downgraded 214D may both be potential status updates (e.g., in a situation such as the expiration of a subscription which can lead to a status downgrade or a membership expiration) and preconfigured rules can be used to determine which one of these two statuses would be the valid option for the output 214. While only three versions 106A-C were previously mentioned, a fourth version of the icon 106 can also be an option for displaying on the graphical user interface to indicate an expired status of the News app.

In other illustrative examples, the entitlement check engine 210 may be configured to implement one or more rules for input 212 corresponding to the foreground 212B status of the News app or a notification 212C corresponding to the News app. For example, one or more of the above-noted considerations upon the cold launch 212A may be applicable to situations in which the News app is in the foreground. For instance, while the News app has the foreground 212B status (e.g., brought into the foreground), the default new 214A status of the output 214 can be maintained (corresponding to version 106A of the icon 106). Based on one or more rules which may be met (e.g., qualifying payments, subscriptions, expirations, etc.) while the News app has the foreground 212B status, the output 214 can be set to an expired 214B, an upgraded 214C, or a downgraded 214D status, as appropriate.

Similarly, the output 214 can be set to a new 214A, an expired 214B, an upgraded 214C, or a downgraded 214D status, as appropriate, based on a notification 212C (e.g., corresponding to qualifying payments, subscriptions, expirations, etc.) independent of a cold launch of the News app or whether the News app is in the foreground of the graphical user interface of the device 100. The icon 106 for the News app can be displayed or represented using one of the versions 106A-C (or other) based on the output 214. In some examples, the output 214 from the entitlement check engine 210 can be provided to an icon management system configured to display the appropriate version of the icon 106 based on the output 214.

Figure 3:
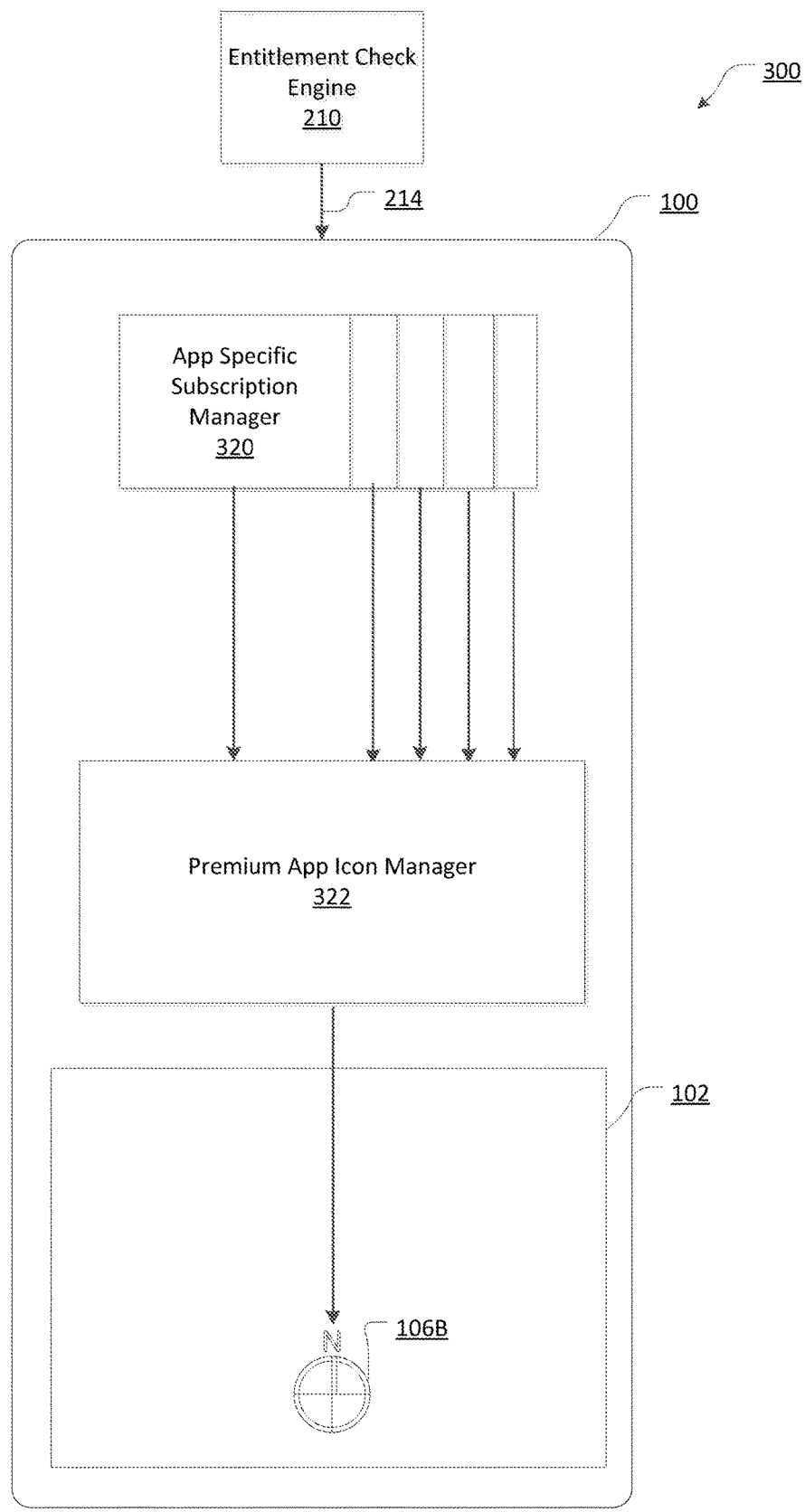
FIG. 3 illustrates an electronic device configured to manage icons on a graphical user interface in accordance with some examples.

FIG. 3 is a block diagram illustrating a system 300 for managing icons on a graphical user interface of an electronic device. For example, the system 300 can be configured for managing one or more icons corresponding to apps on a graphical user interface of the device 100. In an illustrative example as shown, the output 214 from the entitlement check engine 210 of FIG. 2 can be utilized by the device 100 in displaying the appropriate version of the icon 106 for the News app. While illustrated outside of device 100, in some examples, entitlement check engine 210 can be implemented within device 100.

In an example implementation, an app specific subscription manager may be assigned to each app available on the device 100. For example, an app specific subscription manager 320 may be associated with the News app. Various other app specific subscription managers may be associated with the other apps available for user interaction on the device 100. In an example, the app specific subscription manager 320 can manage subscriptions or tiers/statuses associated with the News app. For example, the app specific subscription manager 320 can determine whether any modifications may be warranted to the status of the News app based on qualifying actions or payments.

In some examples, the app specific subscription manager 320 can work in conjunction with the entitlement check engine 210. For example, if the output 214 of the entitlement check engine indicates a new 214A status for the News app, the app specific subscription manager 320 can associate the default set of features with the News app (e.g., for the free version). If the output 214 of the entitlement check engine indicates an expired 214B status for the News app, the app specific subscription manager 320 can withdraw feature associations with the News app. If the output 214 of the entitlement check engine indicates an upgraded 214C status for the News app, the app specific subscription manager 320 can associate features corresponding to one of the higher tiers, e.g., the second tier or the third tier based on predetermined rules implemented by the app specific subscription manager 320 (e.g., an upgrade from the first tier may be the second tier or the third tier; an upgrade from the second tier may be the third tier, etc.). Similarly, if the output 214 of the entitlement check engine indicates a downgraded 214D status for the News app, the app specific subscription manager 320 can associate features corresponding to a lower tier from the current tier e.g., the second tier or the first tier based on predetermined rules implemented by the app specific subscription manager 320 (e.g., an downgrade from the second tier may be the first tier; a downgrade from the third tier may be the second tier or the first tier, etc.). Output 214 can also include a unique identifier which identifies the tier or status level of the app based on the determination of the entitlement check engine.

In some examples, the set of features associated with the News app by the app specific subscription manager 320 can be different from a set of features which were previously associated with the News app. For example, if the output 214 indicates a status which is different from a previous status associated with the News app, then the app specific subscription manager 320 can change the feature set association for the News app. However, in some examples, even if the output 214 indicates a possible change, the app specific subscription manager 320 may not effectively change the feature set association for the News app. For example, if the output 214 indicates an upgrade (upgraded 214C status), but the status of the News app is already at the highest tier, then no upgrade or change may be effected. Similarly, if the output 214 indicates a downgrade (downgraded 214D status), but the status of the News app is already at the lowest tier, then no downgrade or change may be effected. Accordingly, based on whether there has been a change in the status of the News app, the version of the icon 106 displayed on the graphical user interface of the device 100 can be modified.

As shown in FIG. 3, a premium app icon manager 322 can be configured to manage the representation of icons on the graphical user interface displayed on the display 102. In some examples, the premium app icon manager 322 can communicate with the app specific subscription manager 320 to determine whether to modify the representation of an icon. In an illustrative example, if the free version of the News app is initially downloaded onto the device 100, the premium app icon manager may be configured to provide the default version 106A of the icon 106 to be displayed on the graphical user interface of the display 102. Upon any status update, event, or notification which may precipitate a change, the entitlement check engine 210 may provide a corresponding output 214 indicative of a version status of the News app to the app specific subscription manager 320. The app specific subscription manager 320 may effect a change in the feature sets associated with the News app as appropriate or maintain the previous version. When, for example, a change to the second tier was indicated by the entitlement check engine 210, then the output 214 may indicate an upgraded 214C status to the app specific subscription manager 320. In conjunction with associating the second set of features corresponding to the second tier of the News app, the app specific subscription manager 320 may inform the premium app icon manager 322 to update the change icon 106 to the second version 106B corresponding to the second tier of the News app. The premium app icon manager 322 may then provide the updated second version 106B of the icon 106 to be displayed on the display 102 as shown in FIG. 3.

The premium app icon manager 322 may be configured to change the icon for any other app as appropriate based on a change in a status of an app represented by the icon. For example, if the status of the News app is change downgraded, expired, or new in other examples discussed above, the premium app icon manager 322 may be configured to update/replace the icon 106 on the display 102 corresponding to the change in the status of the News app.

Figure 4:
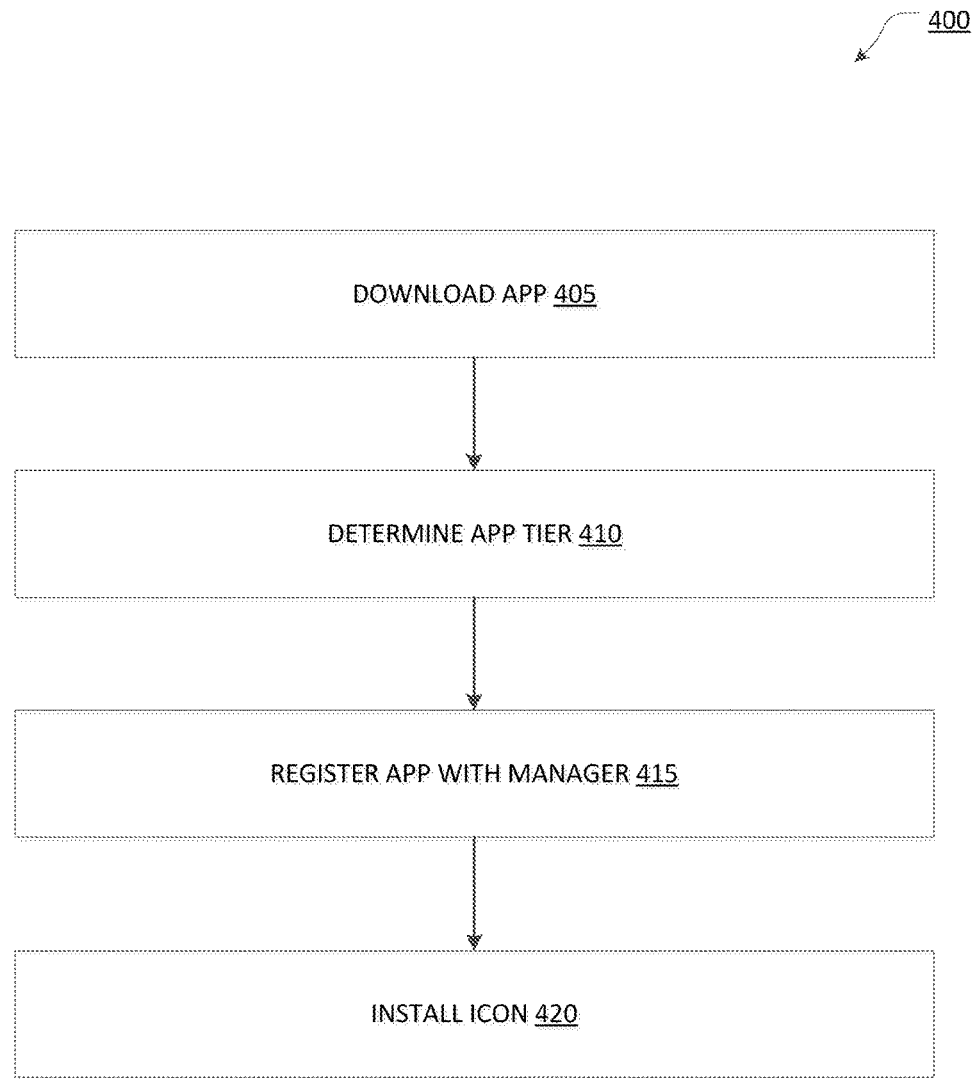
FIG. 4 illustrates a flowchart of an example process for displaying icons on a graphical user interface in accordance with some examples.

FIG. 4 is a flowchart illustrating an example of a process 400 of associating an icon with an app. In some examples, the process 400 can be implemented by the premium app icon manager 322 of FIG. 3. In some examples, the premium app icon manager 322 may obtain information pertaining to the management of icons on the display 102 of the device 100 from the entitlement check engine 210 of FIG. 2, the app specific subscription manager 320, or other system for managing tier associations of one or more apps on the device 100.

At step 405, the process 400 can include downloading an app. For example, the News app can be downloaded on the device 100. Various versions or tiers of the News app may be available for download from an app repository, store, database, etc. Some versions of the News app may be free for download, while others may be available for download based on a qualifying payment or subscription. The News app may be advertised as being available for download through a graphical user interface or other interface of the device 100. In some examples, if the News app was downloaded on a different device commonly accessible by a user of the device 100, then, based on preconfigured user settings, the News app may be automatically downloaded on the device 100. Various techniques for downloading an app such as the News app on an electronic device are known in the art and considered to be within the scope of this disclosure.

At step 410, the process 400 can include determining an app tier associated with the app. subscription status of the News app which was downloaded can be determined (e.g., based on a received status identifier from the app, metadata, etc.). The News app may have been downloaded on the device 100 with an associated tier level which can include the first tier, the second tier, or the third tier, among others. Each tier of the News app can have an associated set of features, such as the first, second, or third set of features, respectively.

At step 415, the process 400 can include registering the app with a manager. For example, the app specific subscription manager 320 and/or premium app icon manager 322 can register the News app and associate its appropriate tier with the registration. The tier of the app can be available from information such as metadata associated with the app. The entitlement check engine 210 can provide the tier information in some examples. Registering the News app and its appropriate tier can include storing the News app, the tier level, a set of available features for the tier level, and any other user specific or app specific information for interacting with the News app generally and/or specifically for that tier level.

At step 420, the process 400 can include installing an icon associated with the app. For example, the premium app icon manager 322 may obtain information pertaining to the tier of the News app from the app specific subscription manager 320 and provide a corresponding version of the icon 106 to be displayed on a graphical user interface of the device 100. For example, depending on the tier level of the News app which was downloaded, the version 106A, 106B, or 106C may be installed on the display 102. In some examples, the graphical user interface can display a plurality of application (app) icons associated with a plurality of applications installed on the device 100. A first application of the plurality of applications such as the News app can have a first application status represented by a first application icon such as the version 106A of the icon 106. The first application status can correspond to the first set of features available using the first application.

Figure 5:
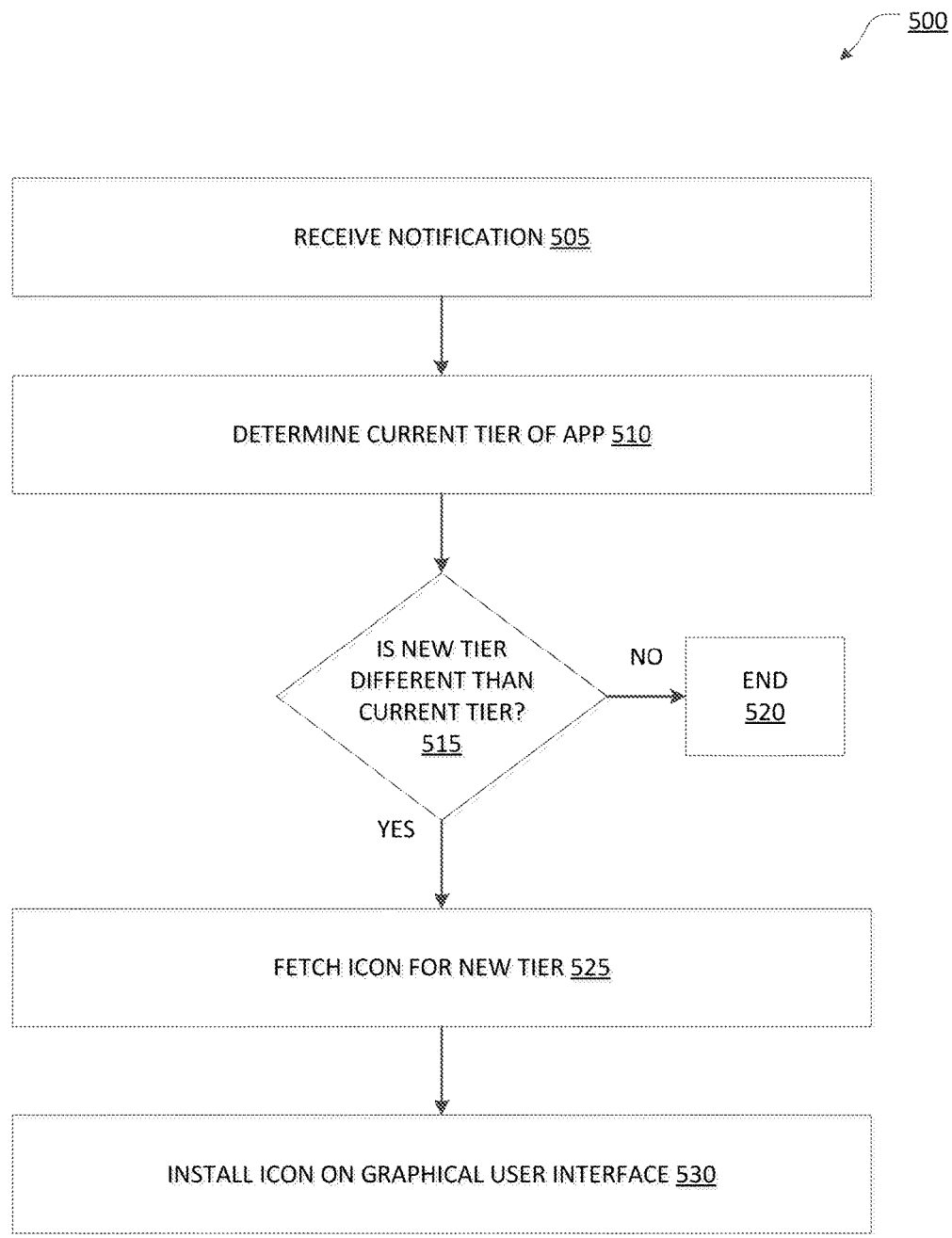
FIG. 5 illustrates a flowchart of an example process for managing icons on a graphical user interface based on associated application status, in accordance with some examples.

FIG. 5 is a flowchart illustrating an example of a process 500 of updating an icon associated with an app. In some examples, the process 500 can be implemented by the premium app icon manager 322 of FIG. 3. In some examples, the premium app icon manager 322 may obtain information pertaining to the management of icons on the display 102 of the device 100 from the entitlement check engine 210 of FIG. 2, the app specific subscription manager 320, or other system for managing tier associations of one or more apps on the device 100.

At step 505, the process 500 can include receiving (at app specific subscription manager 320) a notification associated with an app indicating a tier/status level. In some examples, the notification can be an output (e.g., from entitlement check engine 210) associated with changing a status of an app, such as from a first application status to a second application status. For example, the notification (e.g., output 214) can correspond to the new 214A, expired 214B, upgraded 214C, or downgraded 214D pertaining to the News app along with associated tier/status level, as discussed with reference to FIG. 2. In some examples, the notification can indicate an in-app purchase which can cause a tier upgrade of the News app. As such, the notification can include an indication of a qualifying payment, cold launch or foreground transition which may cause a determination of a status change of the News app.

At step 510, the process 500 can include determining a current tier/status associated with the app. For example, the app specific subscription manager 320 can determine the current tier level associated the News app. The News app in a first tier or first application status may have a first set of features which may be different from a second tier or second application status of the News app associated with a second set of features, for example.

At step 515, the process 500 can include determining whether a new tier/status (received at step 505) is different from the current tier (determined at step 510). In some examples, the new tier may be the same as the current tier, in which case the process 500 may end at the step 520. In some examples, the new tier may be associated with the second application status, for example, where the second application status is different from the first application status corresponding to the current tier. The second application status can correspond to a second set of features available using the News app where the second set of features is different from the first set of features.

According to examples discussed herein, the first application icon such as the version 106A of the News app installed in the step 420 of FIG. 4 may be replaced with a second application icon such as the version 106B reflecting the second application status, where the second application icon is different from the first application icon.

For example, when at the step 515, the new tier/status is determined to be different from the current tier/status, then in step 525, the process 500 can include fetching a new icon for the new tier/status. For example, the app specific subscription manager 322 may obtain the new tier level (from step 505) and provide the premium app icon manager 322 with an indication to fetch a new version of the icon for the News app, if appropriate. The app specific subscription manager 322 may fetch the appropriate replacement icon based on the received indication. In some instances, the replacement icons available can be stored locally on device 100. In other instances, the replacement icons can be downloaded on device 100. In a non-limiting example, the premium app icon manager 322 may fetch the version 106B of the icon 106 corresponding to an upgraded 214C indication when the second application status is an upgrade from the first application status. If the current version is the version 106B of the icon 106, then in another non-limiting example, the premium app icon manager 322 may fetch the version 106A of the icon 106 corresponding to a downgraded 214D indication when the second application status is a downgrade from the first application status.

At step 530, the process 500 can include installing an icon on a graphical user interface of an electronic device. For example, if the new tier is different from the current tier as determined in the step 515, then the premium app icon manager 322 may install the version 106B of the icon 106 for the new tier fetched in the step 525 on the graphical user interface of the device 100. For example, the first application status can correspond to a first tier level (current tier) of a plurality of tier levels and the second application status can correspond to a second tier level (new tier) of the plurality of tier levels. If the new tier is not different from the current tier then the process 500 can end in step 520 with the version 106A of the icon 106 for the current tier of the remaining installed on the graphical user interface of the device 100, e.g., in the step 420 of FIG. 4.

Figure 6:
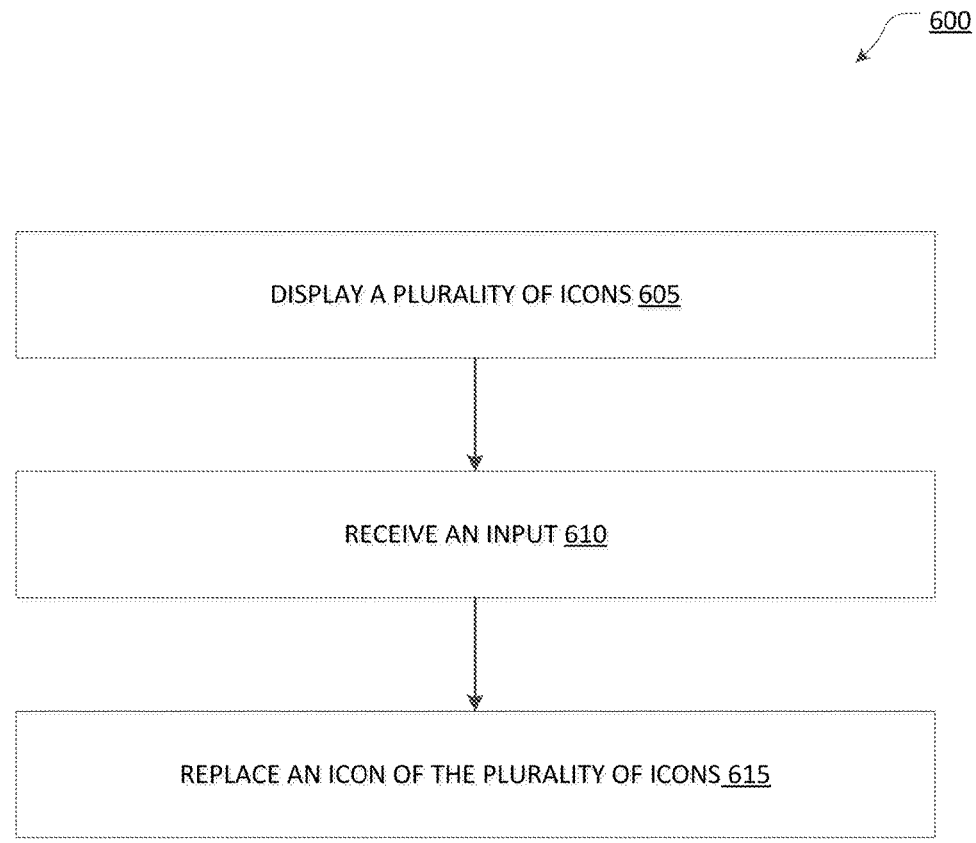
FIG. 6 illustrates a flowchart of an example process for installing icons on a graphical user interface in accordance with some examples.

FIG. 6 is a flowchart illustrating an example of a process 600 for displaying icons on a graphical user interface. At step 605, the process 600 can include displaying a plurality of icons such as the icons 104 and one of the versions 106A-C of the icon 106 on the graphical user interface of the display 102 as discussed with reference to FIGS. 1A-C.

At step 610, the process 600 can include receiving an input. For example, an input 212 including a cold launch 212A, foreground 212B transition, notification 212C or other can be received by the entitlement check engine 210.

At step 615, the process 600 can include replacing an icon of the plurality of icons on the graphical user interface. For example, if based on the input, the entitlement check engine 210 provided an output 214 indicating a change in status for an app, the premium app icon manager 322 can replace a prior icon for the app with a new icon. For example, a new version 106B of the News app can be replaced from a current version 106A of the News app if the output 214 indicates an upgraded 214C status.

Figure 7:
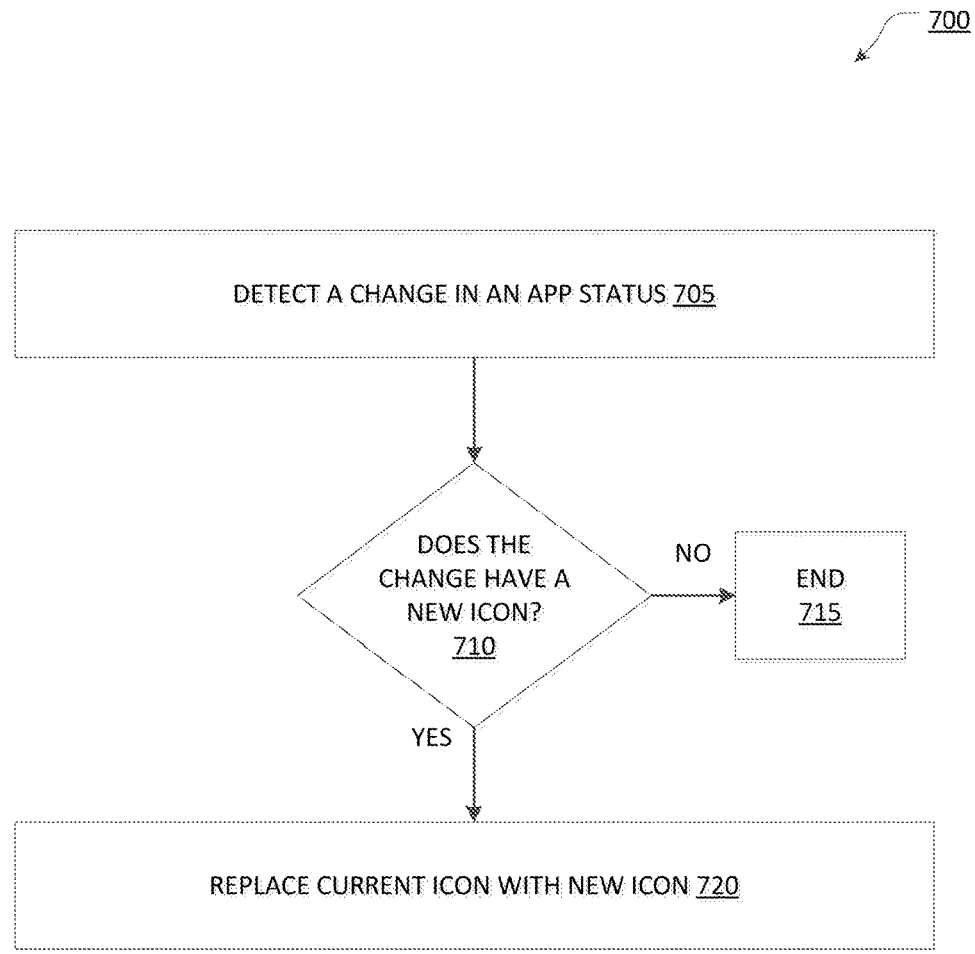
FIG. 7 illustrates a flowchart of an example process for updating icons on a graphical user interface based on associated application status, in accordance with some examples.

FIG. 7 is a flowchart illustrating an example of a process 700 for updating icons associated with an app. At step 705, the process 700 can include detecting a change in an app status/tier. For example, the app specific subscription manager 320 can detect a change in the status of the News app based on the output 214 from entitlement check engine 210. In some examples, the change can be indicated in a new status provided in the output 214, such as the new 214A, the expired 214B, the upgraded 214C, the downgraded 214D, or other status.

At step 710, the process 700 can include determining whether the changed status/tier of the app has a new icon. For example, the app specific subscription manager 320 may determine whether a new set of features are to be associated with the News app based on the output 214. Correspondingly, the premium icon manager 322 may determine whether the version of the icon currently displayed on the graphical user interface of the display 102 is to be replaced based on the detected change in app status (step 705). When the premium icon manager 322 determines a current version of the icon 106 does not have to be updated, then the process 700 may end in step 715. When the premium icon manager 322 determines a current version of the icon 106 is to be replaced (e.g., when the new status has a different icon than the currently presented icon), then the process 700 proceeds to the step 720. For example, the output 214 may indicate an upgraded 214C status, based on which the premium icon manager 322 may determine that the representation of the icon 106 is to be replaced from the version 106A to the version 106B according to the illustrative example discussed with reference to FIG. 3.

At step 720, the process 700 can include replacing a current icon for the app with a new icon. For example, based on determining that the representation of the icon 106 is to be changed from the version 106A to the version 106B, the premium icon manager 322 may cause the version 106B of the icon 106 to be displayed on the graphical user interface of the device 100.

Figure 8:
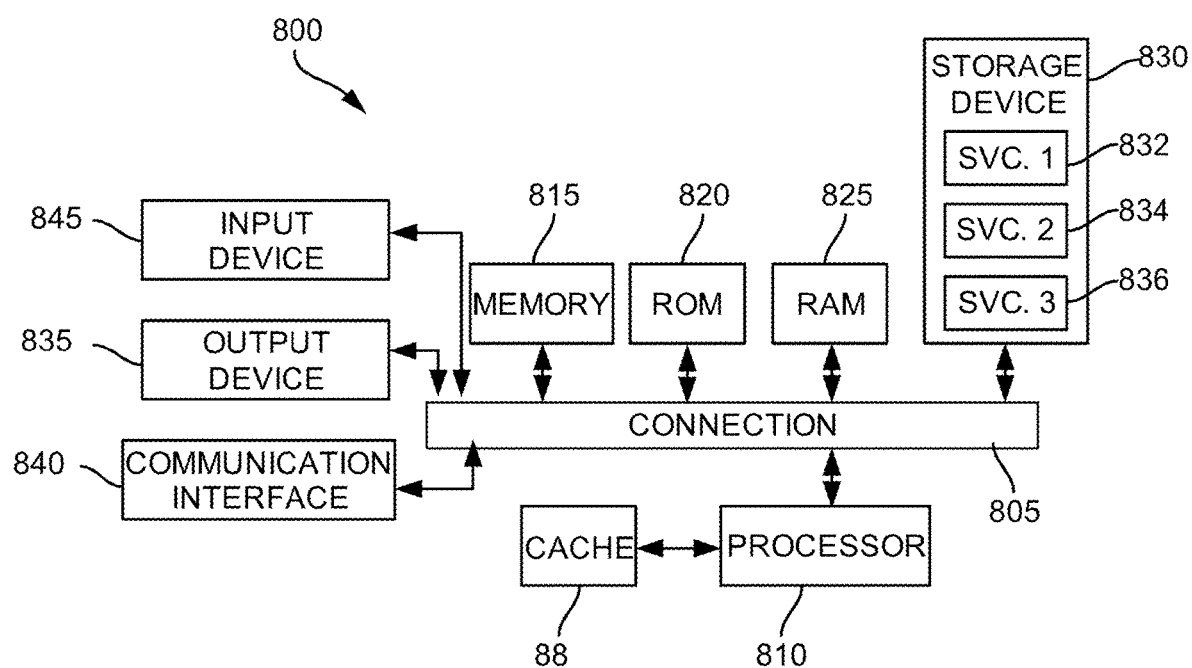
FIG. 8 shows an example system for implementing certain aspects of the present technology.

FIG. 8 shows an example of a computing system 800, which can be for example the electronic device 100, in which the components of the system are in communication with each other using a connection 805. The connection 805 can be a physical connection via a bus, or a direct connection into a processor 810, such as in a chipset architecture. The connection 805 can also be a virtual connection, networked connection, or logical connection.

In some examples, the computing system 800 is a distributed system in which the functions described in this disclosure can be distributed within a datacenter, multiple datacenters, a peer network, etc. In some examples, one or more of the described system components represents many such components each performing some or all of the function for which the component is described. In some examples, the components can be physical or virtual devices.

The computing system 800 can include at least one processing unit (CPU or processor) such as the processor 810, as well as the connection 805 that couples various system components including a system memory 815, such as a read only memory (ROM) or a random access memory (RAM) to the processor 810. The computing system 800 can also include a cache of high-speed memory connected directly with, in close proximity to, or integrated as part of the processor 810.

The processor 810 can include any general purpose processor and a hardware service or software service, such as services 832, 834, and 836 stored in a storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 can include an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement and therefore the basic features here may easily be substituted for improved hardware or firmware arrangements as they are developed.

The storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some examples, a hardware service that performs a particular function can include the software component stored in a computer-readable medium in connection with the necessary hardware components, such as the processor 810, the connection 805, the output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory computer-readable medium.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   detecting, by an application subscription manager, a trigger to check for an application status for a first application installed on a first client device operating under a first entitlement status,
   wherein on a graphical user interface of the first client device, a plurality of application icons represent a plurality of applications installed on the first client device, wherein the first application is one of the plurality of applications, and the first application is installed and operating under the first entitlement status represented by a first icon;
   after detecting the trigger, requesting, by the application subscription manager, a current entitlement status from an entitlement check engine for the first application, the entitlement check engine is a web-based service associated with an app store that provided the first application to the first client device, wherein the trigger is a cold launch of the first application;
   receiving, by the application subscription manager, a response from the entitlement check engine for the current entitlement status of the first application, the response indicating the current entitlement status of the first application;
   determining, by the application subscription manager, that the current entitlement status is different than the first entitlement status.

2. The method of claim 1, wherein the current entitlement status has changed from the first entitlement status as a result of an in-app purchase.

3. The method of claim 1, further comprising:
   registering the first application installed on the first client device with the application subscription manager on the first client device, the application subscription manager is configured to interact with the entitlement check engine to enforce access to features associated with the current entitlement status of the first application and at least one second application installed on the first client device.

4. The method of claim 1, wherein the entitlement check engine is configured to determine entitlements for the plurality of applications available from the app store, wherein the first application is one of the plurality of applications.

5. The method of claim 1, wherein the first entitlement status of the first application changed to the current entitlement status based on an input on another client device, the method comprising:
   receiving a notification from the entitlement check engine of the app store indicating an update to the current entitlement status of the first application.

6. The method of claim 1, wherein the first entitlement status of the first application changed to the current entitlement status by a user account associated with the first client device while operating a second client device that is also associated with the user account.

7. The method of claim 1, comprising:
   storing a plurality of icons including the first icon to represent the first entitlement status and a second icon to represent the current entitlement status.

8. A computing device comprising:
   at least one processor of a first client device; and
   at least one memory storing instructions, which when executed by the at least one processor causes the at least one processor to:
   detect, by an application subscription manager, a trigger to check for an application status for a first application installed on the first client device operating under a first entitlement status,
   wherein on a graphical user interface of the first client device, a plurality of application icons represent a plurality of applications installed on the first client device, wherein the first application is one of the plurality of applications, and the first application is installed and operating under the first entitlement status represented by a first icon;
   after detecting the trigger, request, by the application subscription manager, a current entitlement status from an entitlement check engine for the first application, the entitlement check engine is a web-based service associated with an app store that provided the first application to the first client device, wherein the trigger is a cold launch of the first application;
   receive, by the application subscription manager, a response from the entitlement check engine for the current entitlement status of the first application, the response indicating the current entitlement status of the first application;
   determine, by the application subscription manager, that the current entitlement status is different than the first entitlement status; and in response to the response from the entitlement check engine, install, by an application icon manager, a second icon reflecting the first application operating under the current entitlement status.

9. The computing device of claim 8, wherein the current entitlement status has changed from the first entitlement status as a result of an in-app purchase.

10. The computing device of claim 8, wherein the instructions, when executed by the at least one processor causes the at least one processor to:
registering the first application installed on the first client device with the application subscription manager on the first client device, the application subscription manager is configured to interact with the entitlement check engine to enforce access to features associated with the current entitlement status of the first application and at least one second application installed on the first client device.

11. The computing device of claim 8, wherein the entitlement check engine is configured to determine entitlements for the plurality of applications available from the app store, wherein the first application is one of the plurality of applications.

12. The computing device of claim 8, wherein the first entitlement status of the first application changed to the current entitlement status based on an input on another client device, wherein the instructions, when executed by the at least one processor causes the at least one processor to:
receiving a notification from the entitlement check engine of the app store indicating an update to the current entitlement status of the first application.

13. The computing device of claim 8, wherein the first entitlement status of the first application changed to the current entitlement status by a user account associated with the first client device while operating a second client device that is also associated with the user account.

14. The computing device of claim 8, wherein the instructions, when executed by the at least one processor causes the at least one processor to:
storing a plurality of icons including the first icon to represent the first entitlement status and the second icon to represent the current entitlement status.

15. At least one non-transitory computer readable medium storing instructions, which when executed by at least one processor causes the at least one processor to:
detect, by an application subscription manager, a trigger to check for an application status for a first application installed on a first client device operating under a first entitlement status,
wherein on a graphical user interface of the first client device, a plurality of application icons represent a plurality of applications installed on the first client device, wherein the first application is one of the plurality of applications, and the first application is installed and operating under the first entitlement status represented by a first icon;
after detecting the trigger, request, by the application subscription manager, a current entitlement status from an entitlement check engine for the first application, the entitlement check engine is a web-based service associated with an app store that provided the first application to the first client device, wherein the trigger is a cold launch of the first application;
receive, by the application subscription manager, a response from the entitlement check engine for the current entitlement status of the first application, the response indicating the current entitlement status of the first application;
determine, by the application subscription manager, that the current entitlement status is different than the first entitlement status; and
in response to the response from the entitlement check engine, install, by an application icon manager, a second icon reflecting the first application operating under the current entitlement status.

16. The non-transitory computer readable medium of claim 15, wherein the instructions, when executed by the at least one processor causes the at least one processor to:
registering the first application installed on the first client device with the application subscription manager on the first client device, the application subscription manager is configured to interact with the entitlement check engine to enforce access to features associated with the current entitlement status of the first application and at least one second application installed on the first client device.

17. The non-transitory computer readable medium of claim 15, wherein the first entitlement status of the first application changed to the current entitlement status based on an input on another client device, wherein the instructions, when executed by the at least one processor causes the at least one processor to:
receiving a notification from the entitlement check engine of the app store indicating an update to the current entitlement status of the first application.

18. The non-transitory computer readable medium of claim 15, wherein the instructions, when executed by the at least one processor causes the at least one processor to:
storing a plurality of icons including the first icon to represent the first entitlement status and the second icon to represent the current entitlement status.

\* \* \* \* \*

UNITED STATES PATENT AND TRADEMARK OFFICE
CERTIFICATE OF CORRECTION

PATENT NO. : 12,008,210 B2
APPLICATION NO. : 17/790174
DATED : June 11, 2024
INVENTOR(S) : Peter B. Hu and Manikandan Selvaraju Page 1 of 1

It is certified that error appears in the above-identified patent and that said Letters Patent is hereby corrected as shown below:

On the Title Page

Item (30), should be corrected to include "Foreign Application Priority Data" as follows:
"(30) Foreign Application Priority Data
Jan. 17, 2020 (US)...............16/746,551"

Signed and Sealed this
Twenty-third Day of July, 2024

Katherine Kelly Vidal
*Director of the United States Patent and Trademark Office*